Feb. 20, 1923. 1,446,265
R. C. MURPHY
SKIPPING AND JUMPING PREVENTING MEANS FOR MOWERS
Filed June 29, 1921 2 sheets-sheet 2
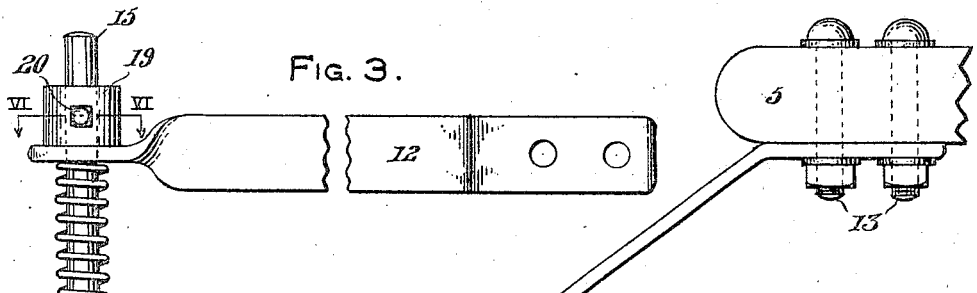
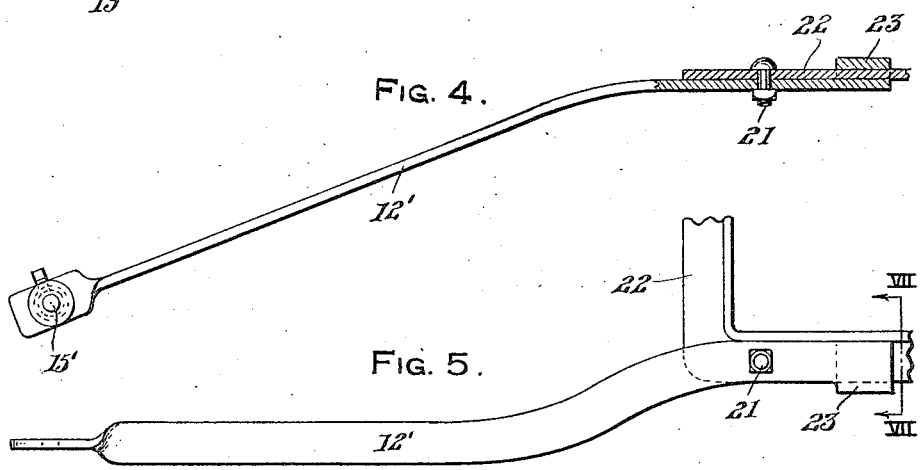
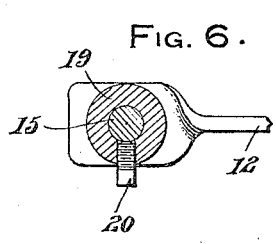
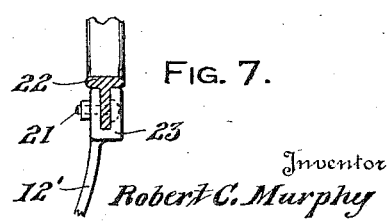
Inventor
Robert C. Murphy
By F. K. Bryant
Attorney Patented Feb. 20, 1923.

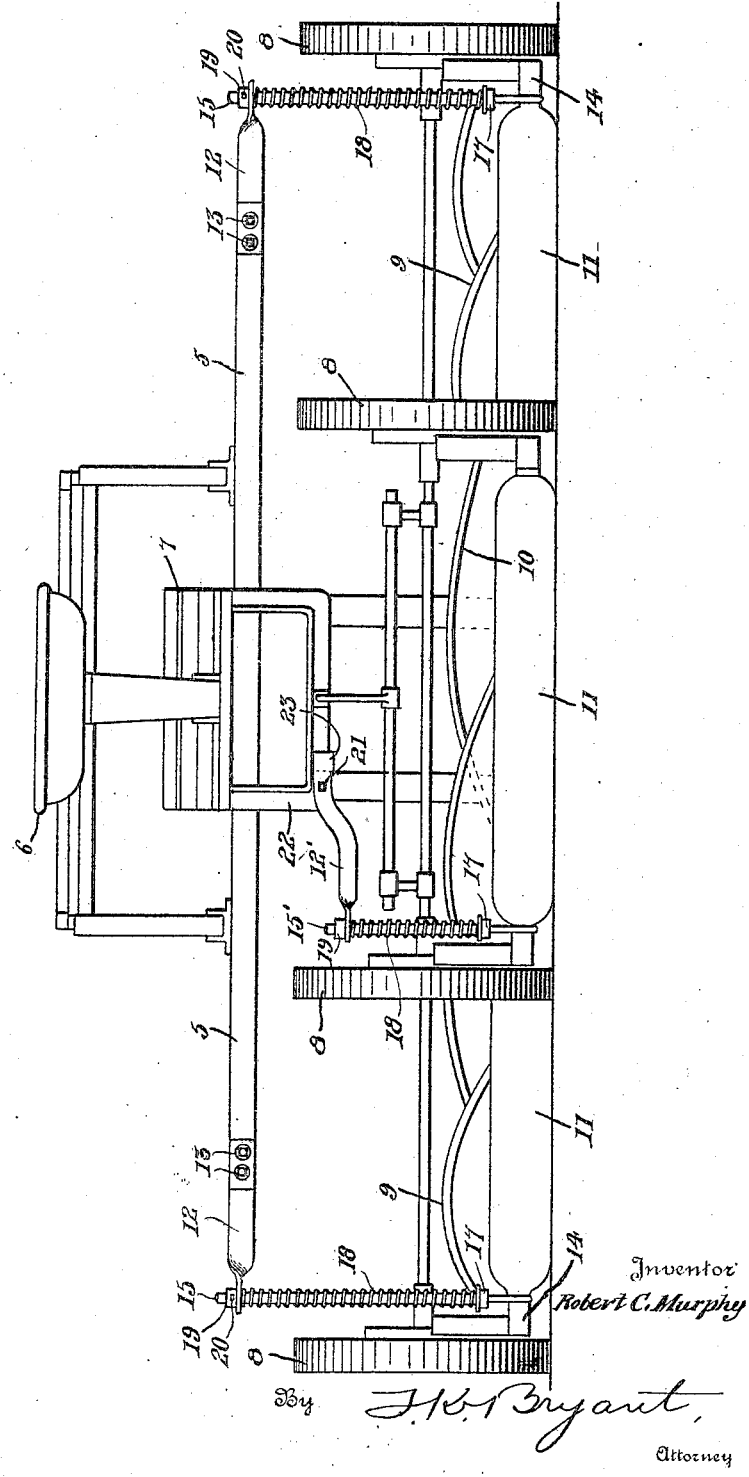

1,446,265

UNITED STATES PATENT OFFICE.

ROBERT C. MURPHY, OF IDAGROVE, IOWA.

SKIPPING AND JUMPING PREVENTING MEANS FOR MOWERS.

Application filed June 29, 1921. Serial No. 481,323.

*To all whom it may concern:*

Be it known that I, ROBERT C. MURPHY, a citizen of the United States of America, residing at Idagrove, in the county of Ida and State of Iowa, have invented certain new and useful Improvements in Skipping and Jumping Preventing Means for Mowers, of which the following is a specification.

Triplex mowers are usually of very light construction and designed for use on golf courses and grounds of similar nature, and these mowers are, generally speaking, very efficient, but they have one serious defect which the present attachment is designed to overcome. Being very light considering the work it is called upon to do on the ordinary golf course, the mower very frequently jumps and skips when it strikes a slight or a large rise or variation in the surface of the ground. This may be true of one or all of the three mowers which make up the triplex machine and the occurrence of the same necessitates a further cutting and consequently loss of time as well as additional expense. In addition to this, the skipping and jumping is a strain on the mower and shortens its period of usefulness, the rougher the ground the more wearing and tear upon the mower.

It is the primary object of the present invention, therefore, to provide a simple and efficient attachment for triplex mowers for yieldingly maintaining contact of the mower elements with the ground as they pass over variations in the surface, thereby preventing the above skipping and jumping and accordingly leaving no uncut patches of grass as well as sparing the machine from the shock of jumps.

With the above general objects in view and others that will appear as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a rear elevational view of a triplex mower provided with an attachment in accordance with the present invention, the mower being indicated and outlined by dotted lines and the attachment being shown by full lines, Figure 2 is a top plan view of one of the end attachments bolted to an end portion of the mower frame, Figure 3 is a view partly in elevation, partly broken away and partly in vertical section of the attachment shown in Fig. 2, Figure 4 is a view somewhat similar to Fig. 2 of the attachment used on the metal mower element, Figure 5 is a fragmentary side elevational view of the device shown in Fig. 4 with the vertical spring pressed rod removed, Figure 6 is a transverse sectional view taken upon line VI—VI of Fig. 3, and Figure 7 is a vertical sectional view taken upon line VII—VII of Fig. 5.

Triplex mowers, broadly speaking, embody a frame including a transverse frame bar 5 which serves as a support for the operators seat 6 and foot board 7 as well as other parts, not shown and this frame is supported upon traction wheels 8, four in number, which are arranged in spaced relation and provided with individual gearing for the actuation of a pair of end rotary cutters 9 and an intermediate rotary cutter 10 each of which are associated with gage rollers 11 adapted to contact with the ground and determine, by their adjustment, the height at which the grass is cut.

The present attachment is designed to cooperate with the journals of the rollers 11 so as to yieldingly maintain contact of said rollers with the ground while permitting upward movement of the same such as is necessary when passing over a rise or the like. The end attachments each embody a piece of relatively stiff strap iron 12 having one end bolted as at 13 to the adjacent end portion of the transverse frame bar 5 and extending rearwardly and outwardly at an angle with its rearmost end portion twisted at right angles and terminating at a point directly above the adjacent journal 14 of the adjacent end roller 11. The twisted end portion of the strap iron 12 is provided with an opening in which a vertical rod 15 is slidably fitted, and the rod 15 is flattened at its lower end and provided with an aperture 16 in which the journal 14 is freely revoluble. A suitable abutment member 17 is fixed upon the lower end portion of the rod 15 and is engaged by the lower end of a helical compression spring 18 which surrounds the rod 15 with its upper end contacting the under face of the twisted end portion of the strap iron 12. Thus, the rod 15 is yieldingly urged in a downward direction so as to maintain contact of the roller 11 with the ground while permitting said roller to be forced upwardly when the same passes over a rise or other obstacle. Downward movement of the rod 15 is limited to the desired extent by means of a collar 19 which is adjustable thereon above the end of the strap 12, adjustment being secured by the provision of a set screw 20 threaded through the collar 19 so as to engage the rod 15 and hold the collar against movement upon the latter.

The form of attachment employed for the middle roller is identical in form to that above described with respect to the end rollers but involves a rod 15' of relatively short length and a slightly different form of attaching strap iron 12'. The strap iron 12' is attached to the mower by holding the same as at 21 with one bolt onto the left brace iron 22 of the mower which is located under the seat 6 and which is of T-formation in section as shown clearly in Figs. 4, 5 and 7. The strap iron 12' is provided with a stirrup as at 23 in which the horizontal depending flange of the brace iron is seated and thus the strap iron is effectively braced against lateral strains and prevented from swinging about the bolt 21 as a pivot. This provides for a very durable but simple form of attachment for the middle strap iron.

In operation, upon forward movement of the mower, the rollers 11 are maintained in contact with the ground by means of rods 15 which are pressed downwardly by means of springs 18, and the rollers will thereby be prevented from leaving the ground accidentally together with the cutter knives due to the approach of the mower elements to a rise in the ground although the springs will compress for permitting the mower elements to give upwardly only a sufficient distance as is necessary to permit the mower elements to pass over this rise. In this manner, the above mentioned skipping and jumping of the mower element is avoided and the leaving of uncut patches of grass is eliminated together with the wear and tear upon the machine which would otherwise take place.

It is believed that the construction and operation as well as the advantages of the present invention will be readily understood and appreciated by those skilled in the art.

Minor changes may be made without departing from the spirit and scope of the invention as claimed.

What is claimed as new is:—

1. In combination with a vertical displaceable mower element and a frame supported thereby, of means between the frame and the mower element for yieldingly maintaining the latter in engagement with the ground so as to prevent skipping and jumping of the same, said last named means including a strap iron fixed to the frame, a rod spring pressed downwardly and slidable through said strap iron, and means operatively connecting the lower end of said rod with said mower element.

2. In combination with a vertical displaceable mower element and a frame supported thereby, of means between the frame and the mower element for yieldingly maintaining the latter in engagement with the ground so as to prevent skipping and jumping of the same, said last named means including a strap iron fixed to the frame, a rod spring pressed downwardly and slidable through said strap iron, and means operatively connecting the lower end of said rod with said mower element, said mower element including a gage roller with which the lower end of said rod is associated.

3. In combination with a vertical displaceable mower element and a frame supported thereby, of means between the frame and the mower element for yieldingly maintaining the latter in engagement with the ground so as to prevent skipping and jumping of the same, said last named means including a strap iron fixed to the frame, a rod spring pressed downwardly and slidable through said strap iron, and means operatively connecting the lower end of said rod with said mower element, said strap iron having its inner end bolted to the mower frame and being provided with a stirrup upon its bolted end portion in which a member of the frame is seated.

4. A jumping and skipping preventing attachment for mowers comprising a strap iron having one end normally bolted to the mower frame and provided with a twisted portion at its other end horizontally disposed and provided with an opening therethrough directly above the journal of the gage roller of said mower, a rod slidably disposed in a vertical position through the opening in the twisted end of said strap iron, means for normally yieldingly urging said rod downwardly and means adapted to connect the lower end of said rod with said gage roller.

In testimony whereof I affix my signature.

ROBERT C. MURPHY.